(12) United States Patent
Anderson

(10) Patent No.: US 6,746,513 B2
(45) Date of Patent: Jun. 8, 2004

(54) INTEGRATED MEMBRANE FILTER

(75) Inventor: Charles L. Anderson, Wilmington, DE (US)

(73) Assignee: L'Air Liquide Societe Anonyme a Directoire et Conseil de Surveillance pour l'Etude et l'Exploitations des Procedes Georges Claude, Paris (FR)

(*) Notice: Subject to any disclaimer, the term of this patent is extended or adjusted under 35 U.S.C. 154(b) by 0 days.

(21) Appl. No.: 10/359,758

(22) Filed: Feb. 8, 2003

(65) Prior Publication Data

US 2003/0154856 A1 Aug. 21, 2003

Related U.S. Application Data

(60) Provisional application No. 60/358,037, filed on Feb. 19, 2002.

(51) Int. Cl.[7] .......................... B01D 53/22; B01D 53/04
(52) U.S. Cl. .......................... 95/45; 95/143; 96/4; 96/8; 96/135
(58) Field of Search .......................... 95/45, 47–55, 95/143; 96/4, 8, 10, 108, 135, 153, 154; 210/321.8, 321.81, 321.89, 321.9

(56) References Cited

U.S. PATENT DOCUMENTS

| | | | |
|---|---|---|---|
| 3,339,341 A | | 9/1967 | Maxwell et al. |
| 4,636,307 A | | 1/1987 | Inoue et al. |
| 4,784,768 A | | 11/1988 | Mathieu |
| 4,834,877 A | * | 5/1989 | Peters et al. ............. 210/198.1 |
| 4,881,953 A | * | 11/1989 | Prasad et al. ................... 95/41 |
| 4,883,023 A | * | 11/1989 | Tsang et al. ............... 123/25 A |
| 5,015,270 A | | 5/1991 | Ekiner et al. ................... 55/16 |
| 5,085,676 A | | 2/1992 | Ekiner et al. ................. 55/158 |
| 5,411,581 A | * | 5/1995 | Robinson .......................... 96/8 |
| 5,429,662 A | * | 7/1995 | Fillet ............................. 95/14 |
| 5,470,379 A | * | 11/1995 | Garrett ............................. 96/4 |
| 5,730,780 A | * | 3/1998 | Booth, III ...................... 95/51 |
| 5,865,877 A | * | 2/1999 | Delp, II ......................... 95/12 |
| 6,019,822 A | * | 2/2000 | Kanzawa et al. ................. 96/8 |
| 6,093,238 A | * | 7/2000 | Huf ................................. 96/8 |
| 2003/0010205 A1 | * | 1/2003 | Bikson et al. ................. 95/52 |

FOREIGN PATENT DOCUMENTS

| | | | | |
|---|---|---|---|---|
| DE | 39 18 430 A | | 12/1990 | |
| DE | 29711 640 U | | 9/1997 | |
| DE | 100 19 695 A | | 10/2001 | |
| EP | 0 358 915 A | | 3/1990 | |
| GB | 2122103 A | * | 1/1984 | ....................... 96/8 |
| GB | 2274253 A | * | 7/1994 | ....................... 96/8 |
| JP | 03-186315 A | * | 8/1991 | ....................... 96/8 |
| JP | 05-137922 A | * | 11/1993 | ....................... 96/8 |
| RU | 2 182 514 C | | 5/2002 | |
| WO | WO 01 80981 A | | 11/2001 | |

OTHER PUBLICATIONS

Charcoal Cloth International Sales, Technical and Material Safety Information, undated.

International Search Report to PCT/IB 03/00637, dated May 13, 2003.

* cited by examiner

*Primary Examiner*—Robert H. Spitzer
(74) *Attorney, Agent, or Firm*—Jeffrey C. Lew; Linda K. Russell

(57) ABSTRACT

A gas separation module includes an adsorbent filter medium inside the case that holds the active gas separation membrane. The adsorbent filter is positioned upstream of the membrane and is operative to extract from the feed gas contaminants which adversely affect membrane separation performance and which if not removed, would cause the membrane separation performance to deteriorate. The adsorbent filter fits within vacant space in conventionally-sized hollow fiber membrane modules and thus can obviate the need to install an external adsorbent filter upstream of the module and/or to enlarge the space occupied by the module to accommodate addition of the internal adsorbent medium.

18 Claims, 2 Drawing Sheets

INTEGRATED MEMBRANE FILTER

This application claims priority of U.S. provisional patent application serial No. 60/358,037 which was filed on Feb. 19, 2002.

FIELD OF THE INVENTION

The present invention relates to a device for gas separation using a membrane adapted to remove contaminants from the feed gas mixture. More specifically it relates to a device in which a feed gas containing contaminants is contacted with an adsorbent material to remove the contaminants within a gas separation membrane module.

BACKGROUND OF THE INVENTION

Many important industrial gas separation processes utilize the principle that a gaseous mixture may be separated into component gases using a selectively gas membrane which is more permeable to one or more of the components of the mixture than other components. Various membrane configurations are used, such as flat sheet, pleated sheet, spiral wound sheet, ribbon tube membranes and the like.

Common commercial processes carry out the separation using membrane modules in which a selectively gas permeable membrane has the form of an elongated bundle of closely packed, small diameter hollow fibers. U.S. Pat. No. 3,339,341 to Maxwell et al., the complete disclosure of which is hereby incorporated by reference herein, describes typical conventional gas separation membrane modules in detail.

For highly efficient and long-term stable operation, selectively gas permeable membranes normally need the feed gas to be substantially free of contaminants such as heavy hydrocarbons. Contaminants can accumulate on the gas transfer surfaces of the membrane or otherwise interfere with transport of the feed gas components through the membrane. Such interference can over time reduce the flow rate of the gas mixture through the membrane and/or the selectivity of the membrane. If contact of the membrane with contaminants is not prevented, or at least reduced, separation performance can deteriorate rapidly to the extent that module should be replaced.

It is known to use pre-treatment facilities in the form of beds or towers containing adsorbent particles such as activated carbon, to remove hydrocarbons from the feed gas mixture before the feed gas enters the module. While such pre-treatment devices may be effective at removing hydrocarbons, there are a number of disadvantages in using separate pre-treatment devices.

Mainly, conventional pre-treatment facilities take up space. Many common adsorbent particles have very slow adsorption kinetic behavior, i.e., they require long contact between the contaminant-entrained feed gas before significant quantities of the contaminants are removed. Consequently, conventional pre-treatment facilities are designed to have long contact times and this is manifested in very large and bulky equipment. One potential utility for selectively permeable membrane separation systems is the generation of inert gas, i.e., nitrogen, from ambient air on board aircraft for example for the purpose of reducing the explosion hazard of fuel storage tanks. In such an application the extra weight as well as the volume of an additional pre-treatment facility upstream of the module is a major practical disadvantage.

Another drawback of large pre-treatment facilities is that they are expensive to provide, operate and maintain. The beds and towers often contain a large inventory of adsorbent material. After a period of operation, the adsorbent becomes saturated and is replaced or the saturated adsorbent is regenerated. The cost to replace adsorbent material is an obvious expense. Also it can be inconvenient to move fresh and spent adsorbent material to and from the saturated pre-treatment facility. Not infrequently, redundant pre-treatment facilities are provided so that one unit can remain in service while another is serviced or regenerated. The cost of duplicate pre-treatment facilities adds to the complexity and the cost. Additionally, the system needed to regenerate saturated pretreatment facilities often further adds to the complexity of a gas separation operation. In some applications separate pretreatment facilities are not feasible due to considerations of space availability, complexity and/or cost.

There is a need in a gas separation process for a pre-treatment facility for cleaning the feed gas mixture to the membrane which consumes a small amount of space relative to the separation unit. It is also desirable to have a pre-treatment facility that is less expensive and simpler to operate and service than conventional filters upstream of membrane modules.

SUMMARY OF THE INVENTION

Accordingly the present invention provides a module comprising a selectively gas permeable membrane for separating components of a gas mixture having gaseous contaminants which can affect the separation performance of the membrane, the module comprising: a shell; a gas separating membrane within the shell; and a filter medium within the shell operative to prevent the contaminants from contacting the membrane.

There is also provided a method of using a membrane to separate components of a gas mixture having gaseous contaminants which can affect the separation performance of the membrane, the method comprising: (1) providing a module comprising a shell; a selectively gas permeable membrane within the shell; and a filter medium operative to selectively remove the contaminants from the gas mixture, the filter medium being positioned between the shell and the membrane; (2) introducing the gas mixture into the shell; (3) conducting the gas mixture through the filter medium, thereby producing a filtered mixture depleted in contaminants relative to the gas mixture; and (4) contacting the membrane with the filtered mixture, thereby forming a permeate gas enriched in more preferentially permeable components of the gas mixture.

DETAILED DESCRIPTION OF THE INVENTION

Basically described, the present invention involves a gas separation membrane module in which an adsorbent material is disposed within the module to remove contaminants that would otherwise adversely affect the membrane from the feed gas mixture to be separated by the membrane. Many conventional gas separation membrane modules use an elongated hollow fiber membrane bundle deployed in a similarly elongated case. These modules typically have empty space inside the case at the end of the bundle directly upstream of the entrance of the feed gas mixture to the individual fiber membranes. It has now been discovered that an adsorbent filter positioned in this space can be effective to strip contaminants entrained in the gas feed, such as hydrocarbon components, and thereby, significantly extend the life of the module. Placing the filter in the otherwise empty space in the module adds negligibly to the pressure gradient due to flow of gas through the module. Perhaps most importantly, it adds no new external equipment and thus can be installed where room for an external filter is not available. Existing modules can be upgraded to integrated filter modules by direct replacement because the new module uses the same case as equivalent conventional modules. These and other benefits of the novel integrated membrane filter will be more fully explained, below.

Figure 1:
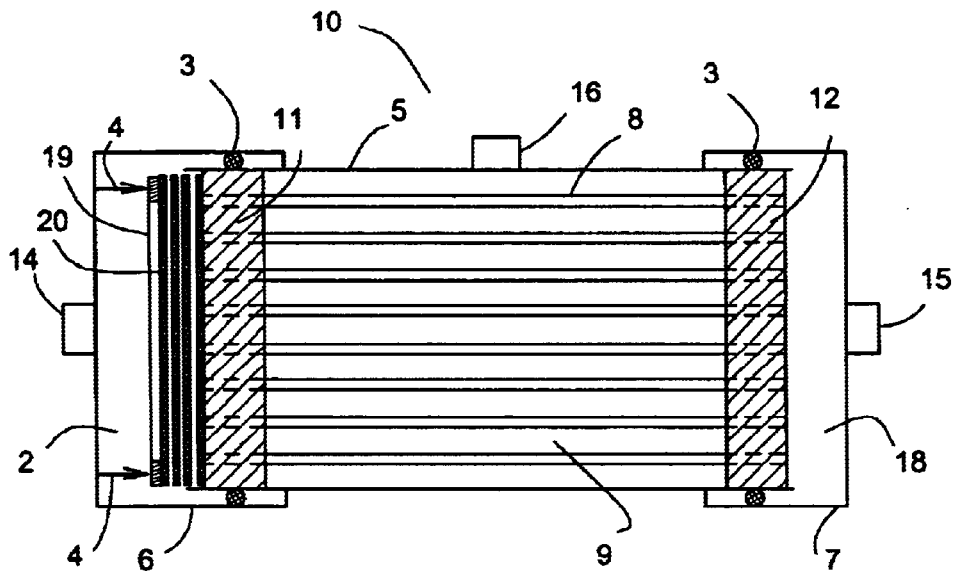
FIG. 1 is a schematic diagram of a partially sectioned view of an embodiment of the present invention.

The invention may be better understood with reference to an embodiment shown in FIG. 1. A gas separation module 10 has an elongated shell 5 and end caps 6 and 7. The end caps are sealed to the shell with O-rings 3 to make the body of the module gas tight. Gas separation occurs by contacting the gas mixture with the selectively permeable membrane which is a tube bundle comprising a plurality of hollow fiber membranes 8 aligned substantially parallel to the elongated axis of shell 5. The fibers extend through and are supported at opposite ends by tube sheets 11 and 12. End caps have tube side ports 14 and 15 which are adapted to allow flow of gas into and out of the module. The case has a shell side port 16 adapted to permit gas in the space 9 surrounding the hollow fibers 8 between tube sheets 11 and 12 to flow out of the module.

In one common method of operating the module shown in FIG. 1, a gas feed mixture of components to be separated by the membranes is admitted into feed chamber 2 through tube side port 14. In a conventional module, the feed gas directly divides and enters the bores of the membrane fibers 8. As the gas travels through the fibers, the more preferentially permeable components permeate the walls of the fibers faster than the less preferentially permeable components. This produces in space 9 a permeate gas composition that is enriched in the more preferentially permeable components. The permeate gas composition can be withdrawn from the module through port 16. Retentate gas which is depleted of the more preferentially permeable components flows in the fibers, out of tube sheet 12, through retentate chamber 18 and discharges through tube side port 15.

According to this embodiment of the invention, a filter element 20 is positioned in the feed chamber. It is located so as to intercept the gas feed mixture before the mixture enters the fibers. The filter element comprises material that selectively adsorbs gaseous contaminants in the feed mixture that are undesirable to reach the fibers. In passing through the filter element, the contaminants adsorb onto the material and leave a substantially contaminant-free gas mixture to enter the fibers.

The adsorbent can be any material that is selective for the contaminants to be removed from the gas mixture. Preferably the adsorbent is a solid phase substance. In many practical circumstances, the contaminants are hydrocarbon compounds. Carbon particles, especially activated carbon particles are known to be useful for extracting hydrocarbons from gas mixtures and are well suited for use as the adsorbent in this invention.

The filter element should be fabricated in a form that allows the gas mixture to flow in close contact with the adsorbent material. This facilitates the transfer of the contaminant onto adsorbent particles. Conventional activated carbon particles in loosely packed beds can be used. Broadly stated, the smaller the size of the adsorbent particles, the faster will be the transfer of contaminants. Consequently, the depth of the bed, i.e., the dimension of the adsorbent particle bed in the direction of gas flow, can be shallower as the particle size is reduced. Preferably, for loosely packed beds, the average size of the particles should be smaller than about 100 U.S. standard mesh.

The bed of adsorbent granular or powder particles should not be disposed directly adjacent to the tube sheet 11. If the particles are too small, they can enter the fiber bores individually and block flow. Larger particles can also occlude the entrances to the bores. Preferably the loosely packed bed will have some container. For example, there can be a back up plate, such as a perforated sheet, a porous fabric or fritted element particle filter between the bed and the fiber bore inlets. To facilitate the fabrication and servicing of the integrated filter membrane unit, the loosely packed adsorbent element can include a bed of adsorbent particles loaded into a cartridge that has perforated faces on its upstream side (i.e., facing the gas feed port 14) and on its downstream side (i.e., facing tubesheet 11). Alternatively, the adsorbent particles can be contained within a porous fabric pouch. The cartridge or pouch should be sized so that it can easily fit into the feed chamber 2. The cartridge or pouch should also not permit the feed gas to travel around the adsorbent. Therefore, these containers should have a seal, such as an o-ring between the outside of the cartridge and the inside of the module, or, in the case of a pouch, a snug fit between the pouch and the surrounding wall of the module.

In a preferred embodiment of the invention, the filter element comprises one or more layers of activated adsorbent cloth. Suitable cloth is available from the Charcoal Cloth International division of Calgon Carbon Corporation (Pittsburgh, Pa.). Activated carbon cloth is believed to be made by pyrolizing carbon-containing fabric. Commercially available cloth suitable for use in this invention is provided in single or double plain weave and single or double knit fabrics. These fabrics have a weight in the range of about 120–260 g/m$^2$ and air permeation in the range of about 40–130 cm$^3$/cm$^2$/s at 10 mm water gauge. The carbon fiber incorporated in the fabric has a diameter of about 50 micrometers. This fabric form of activated carbon is particularly well adapted to expose the adsorbent sites to the contaminated gas. Thus the adsorption kinetics are very favorable. According the depth of the carbon cloth filter element can be much lower than that of a loosely packed powder bed for feed gas traveling through the beds at approximately the same velocity.

FIG. 1 schematically illustrates with exaggeration an integrated adsorbent filter element 20 of four layers of activated carbon cloth positioned in a stack upstream of the feed end tube sheet 11. The stack should be lodged in the feed chamber 2 such that the feed gas mixture is prevented from bypassing travel through the cloth on its way into the fibers. Many conventional sealing techniques can be utilized to achieve this. These are symbolized by arrows 4. For example, a washer 19 loaded by one or more compressed springs can be inserted in the feed cavity between the inside surface of cap 6 and the periphery of the cloth stack. This causes the edges of the stack to bias against the upstream face of tube sheet 11. In another contemplated embodiment, the sealing mechanism 4 includes a static ridge that protrudes inwardly toward the periphery of the stack. As cap 6 is axially mounted on shell 5, for example by screwing with thread means, not shown, the protruding ring forces the edge of the stack in a gas tight seal against tube sheet 11.

Figure 2:
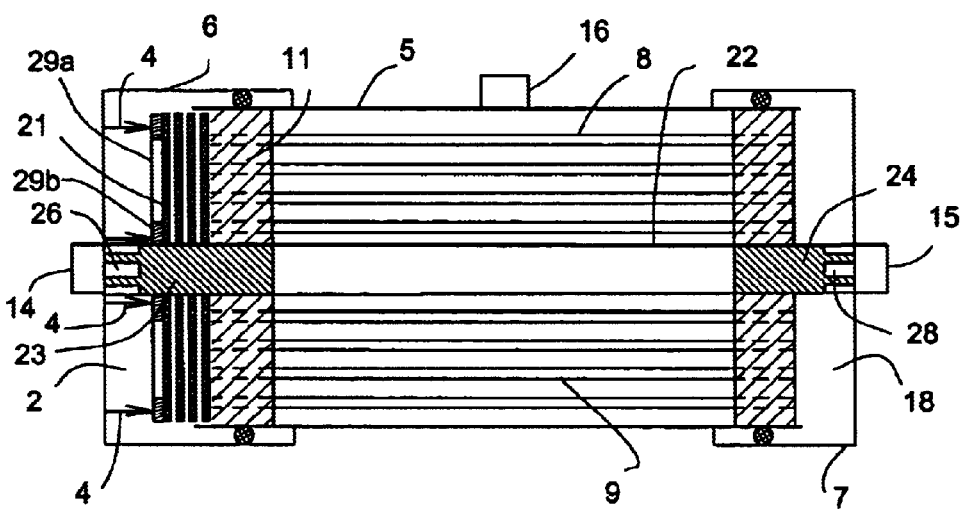
FIG. 2 is a schematic diagram of a partially sectioned view of another embodiment of the present invention.

Another embodiment of the integrated membrane filter is illustrated in FIG. 2. In the figures, like parts have like reference numbers. The membrane module is a type which has a tube 22 extending lengthwise along its centerline. The tube is attached to plugs 23 and 24 which abut with end caps 6 and 7. The feed gas enters the module axially via port 14 and flows into the feed chamber 2 through crenelations 26. Similarly retentate gas flows from the tubes into retentate chamber 18. From the chamber it flows through crenelations 28 and discharges from the module via port 15. The carbon cloth filter elements 21 thus have an annular geometry with a central hole. To install the filter elements, when cap 6 is removed, the filter element(s) is slipped over plug 23 then the cap is replaced. To assure that the feed gas does not bypass the adsorbent filter element, additional seals 4 are provided to push the edge of the annular elements near the plug toward tube sheet 11. The figure shows a large outer diameter washer 29a and a smaller inner diameter washer 29b seated on the outer and inner peripheries, respectively of the annular filter element 21 and depressed against the tube sheet by springs 4.

Figure 3:
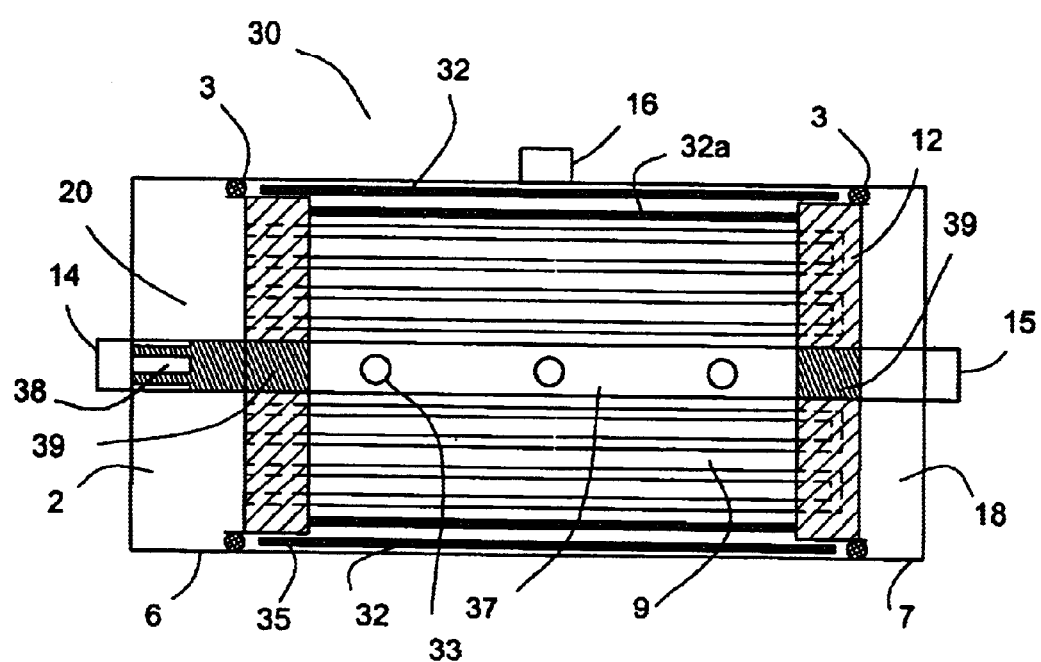
FIG. 3 is a schematic diagram of a partially sectioned view of another embodiment of the present invention.

FIGS. 1 and 2 illustrate a hollow fiber membrane module adapted to operate in a tube-side feed mode. That is, the feed gas mixture to be separated enters the membranes through the bores of fibers and the permeating components pass through the walls to the space surrounding the fibers, sometimes referred to herein as the shell side. FIG. 3 shows a module 30 adapted to operate in shell-side feed mode. The module has a hollow central tube 37 which is held in place by plugs 39 mounted in the tube sheets. Tube 37 has a plurality of holes 33 that communicate the bore of the tube to the shell side space 9. Feed gas enters the shell side space through port 16. Some of the gas permeates the selectively permeable hollow fibers. This gas enters the bores of the fibers and flows to the ends that communicate with chamber 2. The ends of the fibers at tube sheet 12 are blocked, for example by bending the fibers to a U-shape so that both open ends terminate in chamber 2, as shown. The permeate gas exits from the module via crenelations 38 which communicate to the bore at the end of port 14. The retentate gas that does not permeate the fibers flows into holes 33 and enters tube 37. This gas flows toward port 15 through which it departs from the module.

FIG. 3 shows that the shell-side feed mode module can be adapted to utilize the novel integrated membrane filter according to another embodiment of this invention. The filter is an activated carbon cloth 32. The cloth is wrapped circumferentially about the tube bundle. It extends between the case of the module and the side of the tube sheet at position 35. The cloth can be pressure fit or it can be clamped with wire, adhesive, tape or another conventional clamping means, such as a hose clamp. Clamping the cloth prevents the feed gas from bypassing the adsorbent in its path toward the hollow fibers.

The cloth can be a single circumferential wrap about the bundle. To prevent the gas from bypassing the cloth where the circumferential head end of the wrap meets the tail end, tape or adhesive disposed axially along the mating edges of the wrap can be used to effect a seal. More than one circumferential wrap of cloth can be used. FIG. 3 shows a second wrap of cloth 32a. If multiple wraps of a single turn each are deployed, the axial ends should be secured at the nip between the case of the module and the side of the tube sheet (not shown) as with wrap 32. Alternatively, the cloth can be wound about the tube bundle in a spiral. A spiral wound cloth with at least two circumferential turns around the bundle is preferred. When a spiral cloth wrap is used, an optional axial seal can be made with a strip of tape to prevent gas from bypassing the cloth where the outer most turn of the spiral tucks under the outermost layer. A seal is not deemed necessary when at least two full spiral turns are used because it is unlikely that an appreciable amount of feed gas will flow circumferentially along the spiral to bypass the cloth.

In yet another contemplated variation, the wrap of adsorbent can be accomplished by using a quilt of loosely packed adsorbent particles. That is, a quilt can be formed by placing a shallow layer of loose adsorbent particles onto a bottom layer of porous fabric. Then a top layer of fabric is placed over the shallow layer of particles. Lastly, the composite is quilted with stitching threads, adhesive, hot melt sealing the fabric or other conventional method. The product quilt then can be utilized in the same manner as the activated carbon cloth.

As mentioned, it is preferred to utilize the novel integrated membrane filter in a hollow fiber-style membrane module. The membrane in such modules is a plurality of small diameter, thin walled hollow fibers which are typically fabricated from selectively gas permeable polymers in a process occasionally referred to as spinning. The hollow fibers used are generally tubular in form and have an outside diameter of about 75 to about 1000 $\mu$m. The wall thickness is normally in the range of about 25 to about 300 $\mu$m. Preferably the diameter of the bore, i.e., the inner diameter of the fiber is about one-half to about three-quarters of the outside diameter and will preferably lie in the range of about 50 to about 200 $\mu$m.

The separation membranes of many hollow fibers for gas separation modules usually comprise a very thin selective layer that forms part of a thicker structure. This structure may be, for example, an asymmetric membrane, which comprises a thin, dense skin of selectively permeable polymer and a thicker micro-porous support layer which is adjacent to and integrated with the skin. Such membranes are described, for example, in U.S. Pat. No. 5,015,270 to Ekiner.

In a preferred embodiment, the membrane can be a composite membrane, that is, a membrane having multiple layers of typically different compositions. Modem composite membranes typically comprise a porous and non-selective support layer. It primarily provides mechanical strength to the composite. A selective layer of another material that is selectively permeable, is placed coextensively on the support layer. The selective layer is primarily responsible for the separation properties. Typically, the support layer of such a composite membrane is made by solution-casting a film or spinning a hollow fiber. Then the selective layer is usually solution coated on the support in a separate step. Alternatively, hollow-fiber composite membranes can be made by co-extrusion of both the support material and the separating layer simultaneously as described in U.S. Pat. No. 5,085,676 to Ekiner.

A wide range of polymeric materials have desirable selectively gas permeating properties and can be used in the active layer. Representative materials include polyamides, polyimides, polyesters, polycarbonates, copolycarbonate esters, polyethers, polyetherketones, polyetherimides, polyethersulfones, polysulfones, polyvinylidene fluoride, polybenzimidazoles, polybenzoxazoles, polyacrylonitrile, cellulosic derivatives, polyazoaromatics, poly(2,6-dimethylphenylene oxide), polyphenylene oxide, polyureas, polyurethanes, polyhydrazides, polyazomethines, polyacetals, cellulose acetates, cellulose nitrates, ethyl cellulose, styrene-acrylonitrile copolymers, brominated poly (xylylene oxide), sulfonated poly(xylylene oxide), tetrahalogen-substituted polycarbonates, tetrahalogen-substituted polyesters, tetrahalogen-substituted polycarbonate esters, polyquinoxaline, polyamideimides, polyamide esters, blends thereof, copolymers thereof, substituted materials thereof, and the like.

A diverse variety of polymers can be used for the supportive substrate of a composite membrane. Representative substrate polymers include polysulfones, polyether sulfones, polyamides, polyimides, polyetherimides, polyesters, polycarbonates, copolycarbonate esters, polyethers, polyetherketones, polyvinylidene fluoride, polybenzimidazoles, polybenzoxazoles, cellulosic derivatives, polyazoaromatics, poly(2,6-dimethylphenylene oxide), polyarylene oxide, polyureas, polyurethanes, polyhydrazides, polyazomethines, cellulose acetates, cellulose nitrates, ethyl cellulose, brominated poly(xylylene oxide), sulfonated poly(xylylene oxide), polyquinoxaline, polyamideimides, polyamide esters, blends thereof, copolymers thereof, substituted materials thereof and the like. Preferred materials for the substrate layer include polysulfone, polyethersulfone, polyetherimide, polyimide, polyamide compositions and copolymers and blends thereof.

Hollow fiber membrane modules for gas separation are commercially available from many sources, for example the MEDAL unit of Air Liquide (Newport, Del.).

Integrated membrane filters according to the present invention are especially useful for removing hydrocarbon components, sometimes referred to as volatile organic compounds or VOC's, from gas mixtures prior to separating other components of the mixtures in selectively permeable membranes. If not removed, the VOC's would have a de-stabilizing effect on the separation capability of the membrane. A number of advantageous features of the novel integrated membrane filter have been identified, including that the adsorbent filter element can be inserted into a standard size, conventional membrane module with minor mechanical modification of the module. Although there is usually only a relatively small space between the end cap and the tube sheet, or the outer diameter of the tube bundle and the inside surface of the module shell, the available space is sufficient to pack with enough adsorbent to have a significant effect on module performance. This is particularly the case when activated carbon cloth is used as the adsorbent medium. Because this medium picks up VOC's rapidly and because the feed gas flow normally has a slow superficial velocity as it flows through the feed or shell chambers, the contaminant removal kinetics are very favorable.

Membrane modules are usually rated to have a specified service life. After extended contact with contaminants such as VOC's the separation performance decays until the membrane's continued use becomes impractical. In most circumstances, the membranes of hollow fiber modules cannot be rejuvenated when saturated with VOC's. Therefore they must be discarded and replaced. If the adsorbent in an integrated membrane filter is able prior to saturation to capture the amount of VOC's that a module is expected to encounter in its normal service life, that amount will not reach the module. The module can remain in service until a second amount of feed gas mixture passes through the module and deposits the same amount of VOC's on the membrane. In this scenario, the membrane performance will ultimately deteriorate to the point of replacement. However, the service life will have been doubled as compared to an equivalent module not having the integrated membrane filter.

If a membrane is kept free of contact from performance destroying contaminants such as VOC's, the membrane should last for much longer than its rated service life. Accordingly, it is another beneficial feature of the novel integrated membrane filter that the adsorbent filter element can be replaced from time to time before the VOC's are able to penetrate into the membrane portion of the module. Use of the integrated membrane filter can thus extend the utility of a membrane module to many multiple times its rated service life.

Although specific forms of the invention have been selected for illustration in the drawings and the preceding description is drawn in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims.

What is claimed is:

1. A method of using a membrane to separate components of a gas mixture having gaseous contaminants which can affect the separation performance of the membrane, the method comprising:
   providing a module comprising
      a shell;
      a selectively gas permeable membrane within the shell; and
      a filter medium operative to selectively remove the contaminants from the gas mixture, the filter medium being positioned between the shell and the membrane;
   introducing the gas mixture into the shell;
   conducting the gas mixture through the filter medium, thereby producing a filtered mixture depleted in contaminants relative to the gas mixture; and
   contacting the membrane with the filtered mixture, thereby forming a permeate gas enriched in more preferentially permeable components of the gas mixture.

2. The method of gas separation of claim 1 in which the filter medium comprises activated carbon.

3. The method of claim 1 in which the filter medium is activated carbon cloth.

4. A module comprising a selectively gas permeable membrane for separating components of a gas mixture having gaseous contaminants which can affect the separation performance of the membrane, the module comprising:
   a shell;
   a gas separating membrane within the shell; and
   a filter medium within the shell operative to prevent the contaminants from contacting the membrane.

5. The module of claim 4 in which the filter medium is operative to remove hydrocarbons from the gas mixture.

6. The module of claim 5 in which the filter medium comprises activated carbon.

7. The module of claim 5 in which the filter medium comprises adsorbent particles.

8. The module of claim 7 in which the adsorbent particles are contained within a porous pouch.

9. The module of claim 5 in which the filter medium comprises activated carbon cloth.

10. The module of claim 4 in which the gas separating membrane comprises (i) an elongated tube bundle having two ends, the bundle comprising a plurality of hollow fibers, and (ii) a first tube sheet at an end of the bundle which first tube sheet is adapted to join the hollow fibers in parallel fluid communication, and in which the shell and first tube sheet define a tube-side chamber therebetween adapted to distribute the gas mixture into the hollow fibers, the shell defines a first port in fluid communication with the tube-side chamber, and the filter medium is positioned in the tube-side chamber between the first port and the first tube sheet.

11. The module of claim 10 in which the filter medium comprises activated carbon cloth.

12. The module of claim 11 in which the filter medium comprises multiple layers of the activated carbon cloth.

13. The module of claim 10 in which the module comprises a sealing means for preventing the gas mixture from bypassing the filter medium between the first port and the hollow fibers.

14. The module of claim 10 in which the gas separating membrane further comprises a second tube sheet at an end of the bundle opposite the first tube sheet, and in which the shell defines a shell-side chamber outside the hollow fibers and between the tube sheets, in which the shell defines a second port in fluid communication with the shell-side chamber, and in which the filter medium is positioned in the shell-side chamber between the second port and the hollow fibers.

15. The module of claim 14 in which the filter medium comprises activated carbon cloth.

16. The module of claim 15 in which the activated carbon cloth is wrapped around the tube bundle.

17. The module of claim 16 in which the activated carbon cloth is wrapped in a spiral path of at least two full turns around the tube bundle.

18. The module of claim 14 in which the module comprises a sealing means for preventing the gas mixture from bypassing the filter medium between the second port and the hollow fibers.

* * * * *